United States Patent [19]

Ikeda

[11] Patent Number: 5,436,582
[45] Date of Patent: * Jul. 25, 1995

[54] COMPARATOR DEVICE FOR SELECTING RECEIVED SIGNALS

[75] Inventor: Masaharu Ikeda, Yokohama, Japan

[73] Assignee: Matsushita Electric Industrial Co., Ltd., Osaka, Japan

[*] Notice: The portion of the term of this patent subsequent to Aug. 9, 2011 has been disclaimed.

[21] Appl. No.: 112,079

[22] Filed: Aug. 26, 1993

Related U.S. Application Data

[63] Continuation-in-part of Ser. No. 814,590, Dec. 30, 1991, Pat. No. 5,336,945.

[30] Foreign Application Priority Data

Feb. 18, 1991 [JP] Japan .................... 3-23153

[51] Int. Cl.⁶ ............................................. H03K 5/24
[52] U.S. Cl. ......................... 327/65; 327/74; 327/70; 327/63
[58] Field of Search ............. 307/360, 355, 357, 351, 307/350, 356, 241, 242, 494; 328/115, 116, 137, 146, 147, 154; 327/63, 65, 74, 70, 407, 561, 563

[56] References Cited

U.S. PATENT DOCUMENTS 3,916,327 10/1975 Lampen et al. .................... 307/360
4,945,261  7/1990 Wright .............................. 307/360

Primary Examiner—Timothy P. Callahan
Assistant Examiner—Dinh Le
Attorney, Agent, or Firm—Stevens, Davis, Miller & Mosher

[57] ABSTRACT

A comparator device is designed for comparing the signal levels of first and second input signals to provide respective resultant comparator outputs independently, which comparator device is featured in avoidance of occurrence of simultaneous low levels of the comparator signals at all possible conditions of the comparator outputs. The comparator device includes first and second comparator which independently output resultant comparator outputs having either a high (H) level or a low (L) level as results of comparison of the signal levels of the first and second input signals while taking one of the input signals as a reference, and have offset characteristics and hysteresis characteristics so that the comparator outputs, either H level or L level, can be fixedly determined when the first and second input signal levels are equal to each other. The first input signal is applied to one of the input terminal of the first comparator and the other input terminal of the second comparator with a different polarity, and the second input signal is applied to the other input terminal of the first comparator and one of the input terminal of the second comparator with a different polarity.

4 Claims, 8 Drawing Sheets

1: First Predetermined Level
2: Second Predetermined Level

1: First Predetermined Level
2: Second Predetermined Level

COMPARATOR DEVICE FOR SELECTING RECEIVED SIGNALS

This application is a continuation in part of the application Ser. No. 07/814,590 filed on Dec. 30, 1991 and patented on Aug. 9, 1994, U.S. Pat. No. 5,336,945.

BACKGROUND OF THE INVENTION

The present invention relates to a comparator device applicable for switching control for a plurality of paths in a multi-path transmission system receiving an identical modulation signal through a plurality of receiving sections, such as a diversity reception system.

In general, a comparator device to be applied for such type of a diversity reception system includes first and second comparator means having identical hysteresis characteristics. With these comparator means, voltages corresponding to receiving conditions at two transmission paths are compared to control transmission means for transmitting a transmitting signal based on respective comparator outputs. Control is typically performed to switch one of the comparator means from a conducting state to a non-conducting state and the other comparator means from a non-conducting state to a conducting state. Upon input, both of the transmission means for the transmitting signal temporarily become conductive for avoiding drop out of the transmitting signal or click noise due to delay in response at the transmission means.

Here, a diversity receiver having typical two receiving sections, for which the conventional comparator device is applied, is schematically illustrated in FIG. 1.

In the diversity receiver illustrated in FIG. 1, the reference numerals 1 and 2 denote first and second antennas corresponding to respective receiving channels for receiving a common modulation signal, 10 and 20 denote first and second receiver means respectively corresponding to the receiving channels. Through respective receiving channels, first and second demodulation signal outputs of the received signals, and first and second receiving condition signals $V_1$ and $V_2$ corresponding to the receiving conditions of respective receiving channels are obtained. The first and second receiving condition signals $V_1$ and $V_2$ have characteristics to be greater for better receiving condition.

The reference numerals 11 and 21 denote first and second variable transmission means for transmitting the first and second demodulated signals from the first and second receiving means 10 and 20 to a common output terminal 14.

The reference numerals 12 and 22 denote first and second comparator means which have identical hysteresis characteristics. Respective pairs of inputs of the first and second comparator means 12 and 22 have mutually different polarities and the inputs having the different polarities are connected to each other. The first and second receiving condition signals $V_1$ and $V_2$ are supplied from the first and second receiver means 10 and 20 to respective inputs of the first and second comparator means 12 and 22. The first and second comparator means 12 and 22 compare the inputs and respectively output first and second comparator output condition signals $S_1$ and $S_2$. The outputs of the first and second comparator means 12 and 22 are respectively supplied to corresponding ones of the first and second variable transmission means 11 and 21 so that the variable transmission means is controlled into a conducting state in response to HIGH level (hereinafter simply referred to as "H") of the corresponding ones of the first and second comparator output condition signals $S_1$ and $S_2$, and into a non-conducting state in response to LOW level (hereinafter simply referred to as "L") of the corresponding ones of the first and second comparating output condition signals $S_1$ and $S_2$. Therefore, one of the first demodulated signal from the first receiver means 10 and the second demodulated signal from the second receiver means 20 is selectively transmitted to the output terminal 14.

Subsequently, the operation of the conventional diversity receiver having the construction as set forth above will be discussed with reference to FIG. 2.

FIG. 2 illustrates the relationship between the first and second receiving condition signals $V_1$ and $V_2$ as the inputs for the first and second comparator means 12 and 22 and the first and second comparator outputs condition signals $S_1$ and $S_2$ as the outputs thereof.

Here, (a) and (b) of FIG. 2 shows the relationship between the threshold values of the first and second comparing means 12 and 22 having identical hysteresis characteristics and the comparator outputs condition signals $S_1$ and $S_2$, with respect to the first receiving condition signal $V_1$. For these first and second comparator means 12 and 22, the same threshold values are provided. The threshold values for each of the comparator means 12 and 22 are determined such that, taking the non-inverting input thereof as a reference value, an average of two threshold values of each comparator means, i.e. one half of the sum of the threshold values, is greater than the reference value, and the reference value is present between two threshold values. Therefore, when the inverting inputs have a value equal to the reference value, the comparator output condition signal of the comparator means can be either H or L.

In case that the difference polarities of inputs of the first and second comparator means 12 and 22 are connected to the first and second receiver means 10 and 20 and taking the first receiving condition signal $V_1$ as a reference, the relationship of the levels of the threshold values in the second comparing means 22 is reversed so that the average value of two threshold values becomes smaller than the reference value as can be seen in (b) of FIG. 2. Therefore, when such connection is established, the threshold values of respective ones of the first and second comparing means 12 and 22 should have mutually different values to perform the operations as illustrated in (a) and (b) of FIG. 2.

Namely, assuming $V_2 < < V_1$, $S_1 = H$ and $S_2 = L$ are established so that the demodulated signal of the receiver means 10 is supplied to the output terminal 14.

Here, when the level of the second receiving condition signal $V_2$ rises to reach the threshold value across which output of the comparator means 22 is switched from L to H, $S_1 = H$ and $S_2 = H$ are established so that the first demodulated signal of the first receiver means 10 and the second demodulated signal of the second receiver means 20 are supplied to the output terminal 14 in parallel. At this time, since each of the demodulated signals is derived through demodulation of the same modulation signals and thus should have the same amplitude, such parallel supply condition of the demodulated signals will never cause variation of the amplitude. When the level of the second receiving condition signal $V_2$ further rises to reach the threshold value, across which the first comparator output condition signal of the first comparator means 12 is switched from H to L, $S_1 = L$ and $S_2 = H$ are established so that the second demodulated signal of the second receiver means 20 is supplied to the output terminal 14 and the first demodulated signal of the first receiver means 10 is disconnected from the output terminal 14 for completing the switching operation.

In FIG. 2, (c) and (d) show all possible transitions of the first and second comparator output condition signals $S_1$ and $S_2$ relative to variation of the second receiving condition signal $V_2$ taking the first receiving condition signal $V_1$ as a reference. As can be seen therefrom, at the transition according to variation of the first and second receiving condition signals $V_1$ and $V_2$ for switching supply of the demodulated signals from that of the first receiving means 10 to that of the second receiving means, and vice versa, both of the first and second demodulated signals are supplied to the output terminal in parallel, temporarily. Since the hysteresis of respective ones of the comparator means 12 and 22 will not change even when the amplitude of the first receiving condition signal $V_1$, taken as a reference, changes, the condition of the operation is not dependent on the first receiving condition signal $V_1$.

As set forth above, even in the conventional comparator device, as applied to the diversity receiver, both of the demodulated signals are temporarily transmitted at the transition for switching demodulated outputs of two receiver means for avoiding occurrence of signal drop out in click noise due to delay of operation in the transmission means. Also, since it utilizes the hysteresis characteristics, the transmission state, in which both of the demodulated outputs are transmitted, is past at a speed proportional to the speed of variation even at high variation speed of the receiving condition signals and thus can follow even for substantial variation of the switching frequency.

However, in the conventional comparator device constructed as set forth above, as can be seen in (d) of FIG. 2, a problem is encountered in that the condition, in which none of the demodulated signals of the first and second receiver means 10 and 20 is transmitted, i.e., the condition where both of the comparator output condition signals $S_1$ and $S_2$ are L, resides in the proximity of the important portion where the receiving condition signals $V_1$ and $V_2$ are close to each other. Though such condition may not be introduced during normal operation, there is a possibility of introduction as affected by noise and so forth. This makes it difficult to guarantee reception which is the fundamental task of the diversity reception system.

SUMMARY OF THE INVENTION

The present invention is to solve such problems in the prior art. Therefore, it is an object of the present invention to provide a comparator device which does not have the condition where both comparator outputs become L at any condition of the comparator outputs, can temporarily transmit more than one demodulated outputs during transition for successfully avoiding signal drop out or click noise due to delay of operation of the transmission means, and has a capability of comparing two or more signals.

In order to accomplish above-mentioned objects, a comparator device, according to the present invention, is designed for comparing the signal levels of first and second input signals to provide respective resultant comparator outputs independently. The comparator device includes first and second comparator means which independently output resultant comparator outputs either of H level and L level as results of comparison of the signal levels of the first and second input signals with taking one of the input signals as reference, said means having offset characteristics and hysteresis characteristics so that the comparator outputs, either H level or L level, can be fixedly determined when the first and second input signal levels are equal to each other. The first input signal is applied to one of the input terminal of the first comparator means and the other input terminal of the second comparator means with different polarity, and the second input signal is applied to the other input terminals of the first comparator means and one of the input terminal of the second comparator means, having different polarity.

Also, the comparator device, according to the present invention, is designed for separately comparing signal levels of a plurality of input signals, and for outputting resultant comparator outputs. The comparator device has a maximum value (minimum value) determining and selecting means for determining a maximum value (or minimum value) input signal among the input signals.

The comparator device also has a plurality of comparator means for receiving the input signal at one input terminal and signals outputted from the maximum value (minimum value) determining and selecting means at the other terminals, and separately outputting either H level or L level as results of comparison of the signal levels of the input signals, said comparator means having offset characteristics and hysteresis characteristics so that the comparator outputs being fixedly determined when the input terminals levels are equal to each other.

Accordingly, in the comparator device constructed as set forth above, since the first and second comparator means are provided offset characteristics and the hysteresis characteristics for fixedly determining the comparator output either at H level or L level when the signal levels inputted to the input terminals of the comparator means are equal to each other, the comparator outputs as the results of comparison will become alternatively H level and L level or become both H levels, and cannot become both L levels.

According to a first case, the present claimed invention is directed to providing a comparator device for comparing signal levels of first and second input signals and outputting independently two comparison results, said device comprising:

first and second comparator means, each including a first terminal and a second terminal and each for comparing a level of a signal applied to said first terminal with a level of a signal applied to said second terminal and for outputting a binary signal (a) which has a first value when the level of the signal applied to said second terminal minus the level of the signal applied to said first terminal is less than a first predetermined level, (b) which has a second value when the level of the signal applied to said second terminal minus the level of the signal applied to said first terminal is greater than a second predetermined level, said second predetermined level being larger than said first predetermined level, (c) which, when a difference between the level of the signal applied to said second terminal and that applied to said first terminal lies within a range between said first predetermined level and said second predetermined level, maintains its value at a preceding one of said first and second values that it had before said difference entered said range, and (d) which takes said first value when the level of the signal applied to said first terminal is equal to the level of the signal applied to said second terminal;

means for applying said first input signal to the first terminal of said first comparator means and to the second terminal of said second comparator means;

means for applying said second input signal to the second terminal of said first comparator means and to the first terminal of said second comparator means; and means for outputting the binary signals output from said first and second comparator means as the two comparison result of said comparator device.

According to a second case, the present invention is directed to providing a comparator device for comparing signal levels of first and second input signals and outputting independently two comparison results, said device comprising:

first and second comparator means, each including a first terminal and a second terminal and each for comparing a level of a signal applied to said first terminal with a level of a signal applied to said second terminal and for outputting a binary signal (a) which has a first value when the level of the signal applied to said first terminal minus the level of the signal applied to said second terminal is greater than a first predetermined level, (b) which has a second value when the level of the signal applied to said first terminal minus the level of the signal applied to said second terminal is less than a second predetermined level, said second predetermined level being less than said first predetermined level, (c) which, when a difference between the level of the signal applied to said first terminal and that applied to said second terminal lies within a range between said first predetermined level and said second predetermined level, maintains its value at a preceding one of said first and second values that it had before said difference entered said range, and (d) which takes said second value when the level of the signal applied to said first terminal is equal to the level of the signal applied to said second terminal;

means for applying said first input signal to the first terminal of said first comparator means and to the second terminal of said second comparator means;

means for applying said second input signal to the second terminal of said first comparator means and to the first terminal of said second comparator means; and means for outputting the binary signals output from said first and second comparator means as the two comparison results of said comparator device.

According to a third case, the present invention is directed to providing a comparator device for comparing signal levels of first and second input signals and outputting independently two comparison results, said device comprising:

first and second comparator means, each including a first terminal and a second terminal and each for comparing a level of a signal applied to said first terminal with a level of a signal applied to said second terminal and for outputting a binary signal (a) which has a first value when a ratio of the level of the signal applied to said first terminal to the level of the signal applied to said second terminal is greater than a first predetermined ratio, (b) which has a second value when the ratio of the level of the signal applied to said first terminal to the level of the signal applied to said second terminal is less than a second predetermined ratio, said first predetermined ratio being larger than said second predetermined ratio and less than 1, (c) which, when the ratio of the level of the signal applied to the first terminal to the level of the signal applied to the second terminal lies within a range between said first predetermined ratio and said second predetermined ratio, maintains its value at a preceding one of said first and second values that it had before said ratio entered said range, and (d) which takes said first value when the level of the signal applied to said first terminal is equal to the level of the signal applied to said second terminal;

means for applying said first input signal to the first terminal of said first comparator means and to the second terminal of said second comparator means;

means for applying said second input signal to the second terminal of said first comparator means and to the first terminal of said second comparator means; and means for outputting the binary signals output from said first and second comparator means as the two comparison results of said comparator device.

According to a fourth case, the present invention is directed to providing a comparator device for comparing signal levels of first and second input signals and outputting independently two comparison results, said device comprising:

first and second comparator means, each including a first terminal and second terminal and each for comparing a level of a signal applied to said first terminal with a level of a signal applied to said second terminal and for outputting a binary signal (a) which has a first value when a ratio of the level of the signal applied to said first terminal to the level of the signal applied to said second terminal is greater than a first predetermined ratio, (b) which has a second value when the ratio of the level of the signal applied to said first terminal to the level of the signal applied to said second terminal is less than a second predetermined ratio, said second predetermined ratio being larger than 1 and less than said first predetermined ratio, (c) which, when the ratio of the level of the first terminal signal to the level of the second terminal signal lies within a range between said first predetermined level and said second predetermined level, maintains its value at a preceding one of said first and second values that it had before said ratio entered said range, and (d) which takes said second value when the level of the signal applied to said first terminal is equal to the level of the signal applied to said second terminal;

means for applying said first input signal to the first terminal of said first comparator means and to the second terminal of said second comparator means;

means for applying said second input signal to the second terminal of said first comparator means and to the first terminal of said second comparator means; and means for outputting the binary signals output from said first and second comparator means as the two comparison results of said comparator device.

According to a fifth case, the present invention is directed to providing a comparator device for comparing signal levels of a plurality of input signals and outputting independently comparison results for each input signal, said device comprising:

maximum level determining means for determining an input signal having a maximum level among said plurality of input signals and outputting a signal corresponding to the determined maximum level input signal;

a plurality of comparator means, each including a first terminal and a second terminal and each for comparing a level of a signal applied to said first terminal with a level of a signal applied to said second terminal and for outputting a binary signal (a) which has a first value when the level of the signal applied to said second terminal minus the level of the signal applied to said first terminal is less than a first predetermined level, (b) which has a second value when the level of the signal applied to said second terminal minus the level of the signal applied to said first terminal is greater than a second predetermined level, said second predetermined level being larger than said first predetermined level, (c) which, when a difference between the level of the signal applied to said second terminal and that applied to said first terminal lies within a range between said first predetermined level and said second predetermined level, maintains its value at a preceding one of said first and second values that it had before said difference entered said range, and (d) which takes said first value when the level of the signal applied to said first terminal is equal to the level of the signal applied to said second terminal;

means for applying said input signals to the first terminals of said comparator means respectively;

means for applying the signal output from said maximum level determining means to the second terminal of each comparator means; and means for outputting the binary signals output from said comparator means as the comparison results of said comparator device.

According to a sixth case, the present invention is directed to providing a comparator device for comparing signal levels of a plurality of input signals and outputting independently comparison results for each input signal, said device comprising:

minimum level determining means for determining an input signal having a minimum level among said plurality of input signals and outputting a signal corresponding to the determined minimum level input signal;

a plurality of comparator means, each including a first terminal and a second terminal and each for comparing a level of a signal applied to said first terminal with a level of a signal applied to said second terminal and for outputting a binary signal (a) which has a first value when the level of the signal applied to said first terminal minus the level of the signal applied to said second terminal is greater than a first predetermined level, (b) which has a second value when the level of the signal applied to said first terminal minus the level of the signal applied to said second terminal is less than a second predetermined level, said second predetermined level being less than said first predetermined level, which, when a difference between the level of the signal applied to said first terminal and that applied to said second terminal lies within a range between said first predetermined level and said second predetermined level, maintains its value at the preceding one of said first and second values that it had before said difference entered said range, and (d) which takes said second value when the level of the signal applied to said first terminal is equal to the level of the signal applied to said second terminal;

means for applying said input signals to the first terminals of said comparator means respectively;

means for applying the signal output from said minimum level determining means to the second terminal of each comparator means; and means for outputting the binary signals output from said comparator means as the comparison results of said comparator device.

According to a seventh case, the present invention is directed to providing a comparator device for comparing signal levels of a plurality of input signals and outputting independently comparison results for each input signal, said device comprising:

maximum level determining means for determining an input signal having a maximum level among said plurality of input signals and outputting a signal corresponding to the determined maximum level input signal;

a plurality of comparator means, each including a first terminal and a second terminal and each for comparing a level of a signal applied to said first terminal with a level of a signal applied to said second terminal and for outputting a binary signal (a) which has a first value when a ratio of the level of the signal applied to said first terminal to the level of the signal applied to said second terminal is greater than a first predetermined ratio, (b) which has a second value when the ratio of the level of the signal applied to said first terminal to the level of the signal applied to said second terminal is less than a second predetermined ratio, said first predetermined ratio being larger than said second predetermined ratio and less than 1, (c) which, when the ratio of the level of the signal applied to the first terminal to the level of the signal applied to the second terminal lies within a range between said first predetermined ratio and said second predetermined ratio, maintains its value at a preceding one of said first and second values that it had before said ratio entered said range, and (d) which takes said first value when the level of the signal applied to said first terminal is equal to the level of the signal applied to said second terminal;

means for applying said input signals to the first terminals of said comparator means respectively;

means for applying the signal output from said maximum level determining means to the second terminal of each comparator means;

means for outputting the binary signals output from said comparator means as the comparison results of said comparator device.

According to an eighth case, the present invention is directed to providing a comparator device for comparing signal levels of a plurality of input signals and outputting independently comparison results for each input signal, said device comprising:

minimum level determining means for determining an input signal having a minimum level among said plurality of input signals and outputting a signal corresponding to the determined minimum level input signal;

a plurality of comparator means, each including a first terminal and a second terminal and each for comparing a level of a signal applied to said first terminal with a level of a signal applied to said second terminal and for outputting a binary signal (a) which has a first value when a ratio of the level of the signal applied to said first terminal to the level of the signal applied to said second terminal is greater than a first predetermined ratio, (b) which has a second value when the ratio of the level of the signal applied to said first terminal to the level of the signal applied to said second terminal is less than a second predetermined ratio, said second predetermined ratio being larger than 1 and less than said first predetermined ratio, (c) which, when the ratio of the level of the first terminal signal to the level of the second terminal signal lies within a range between said first predetermined level and said second predetermined level, maintains its value at a preceding one of said first and second values that it had before said ratio entered said range, and (d) which takes said second value when the level of the signal applied to said first terminal is equal to the level of the signal applied to said second terminal;

means for applying said input signals to the first terminals of said comparator means respectively;

means for applying the signal output from said minimum level determining means to the second terminal of each comparator means; and means for outputting the binary signals output from said comparator means as the comparison results of said comparator device.

Another aspect of the present invention is to provide a comparator device according to any of the above cases wherein each of said first and second comparator means is formed into an integrated module.

DESCRIPTION OF THE PREFERRED EMBODIMENTS

Various embodiments of comparator devices according to the present invention will be discussed herebelow with reference to FIGS. 3 to 7.

Figure 1:
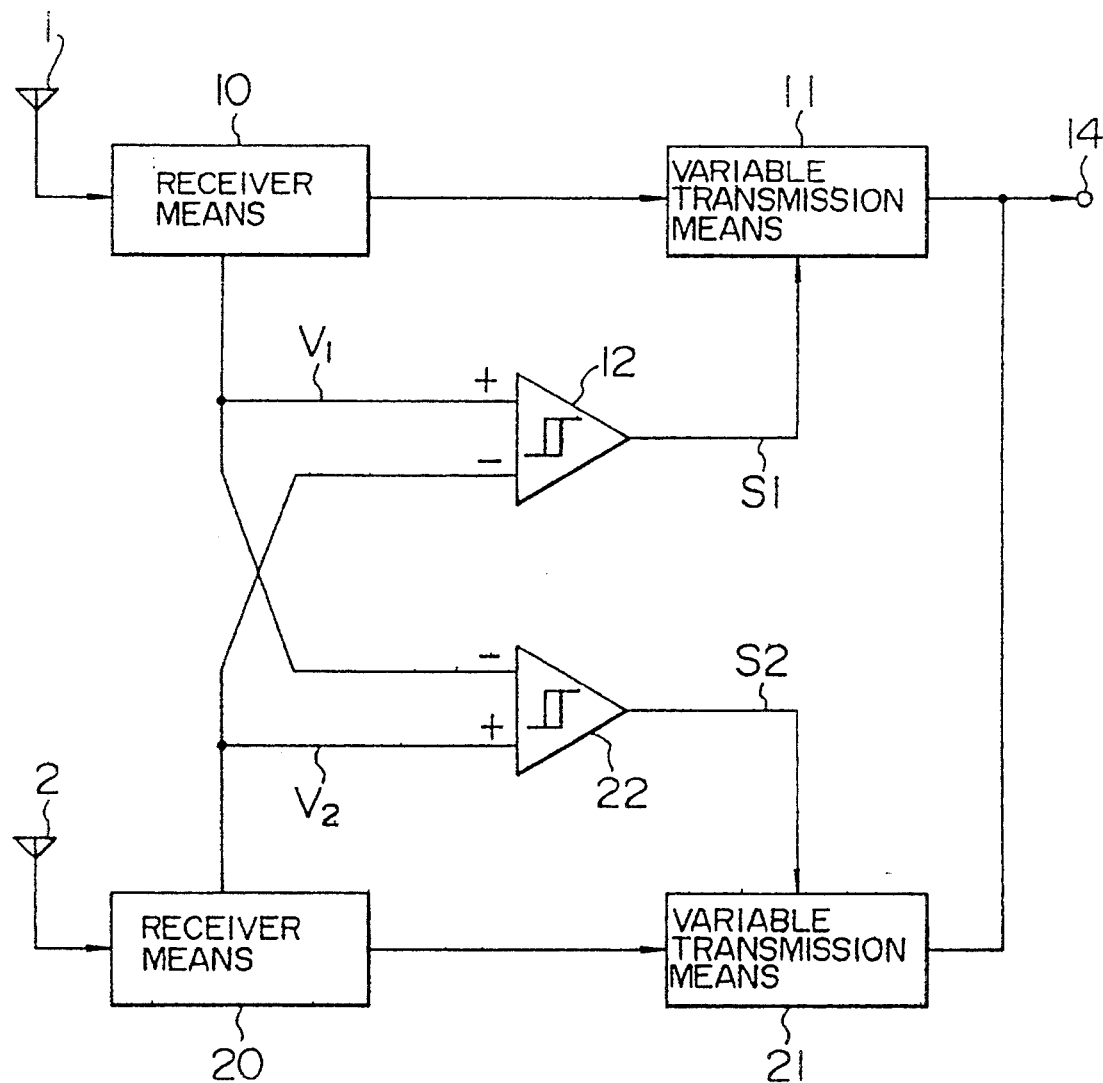
FIG. 1 is a schematic block diagram of the construction, in which the conventional comparator device is applied for a typical diversity receiver.
Figure 2:
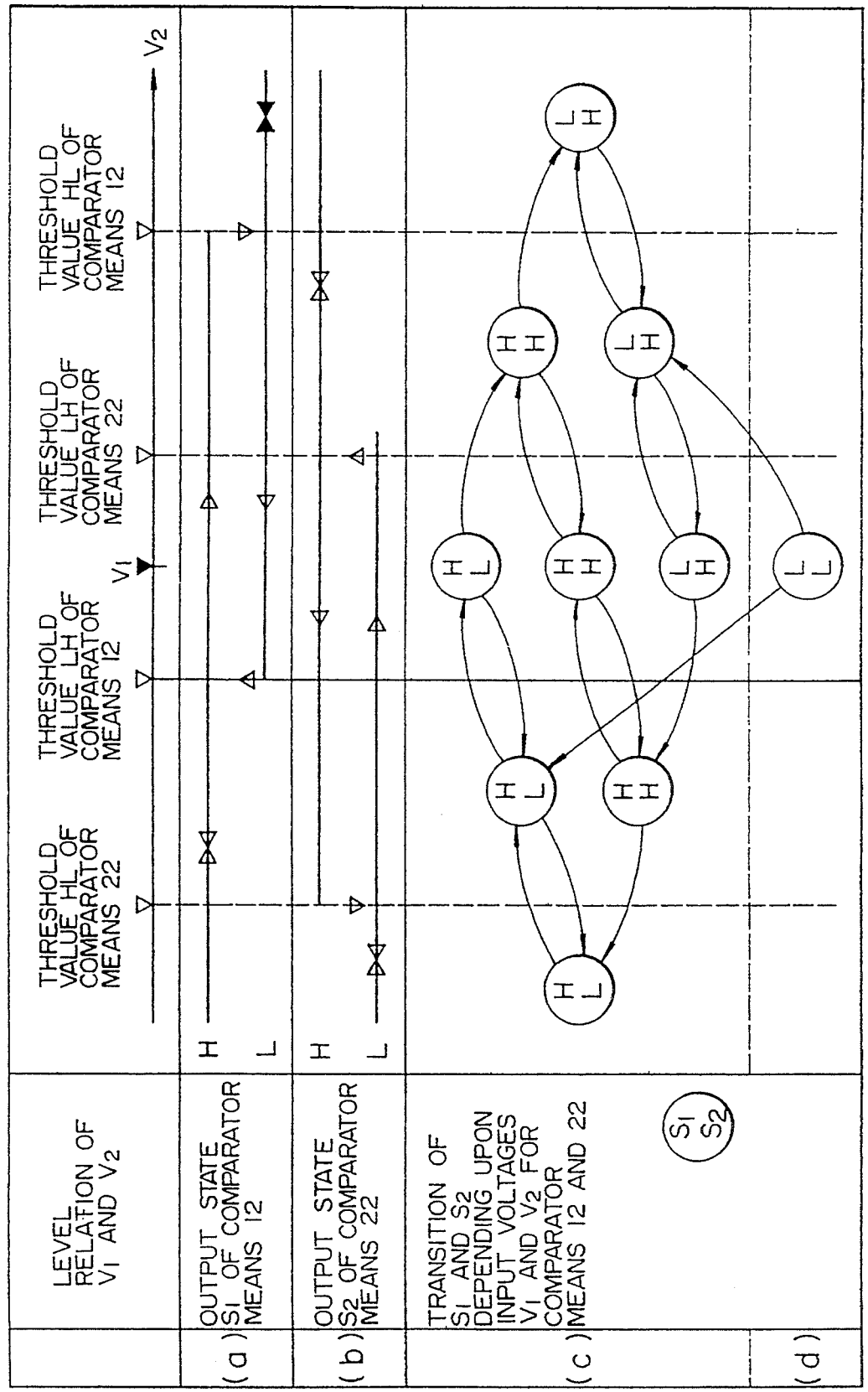
FIG. 2 is a chart showing transition states in the conventional comparator device, in which is illustrated the relationship between signal levels of respective first and second receiving condition signals as inputs for first and second comparator means, and first and second comparator output condition signals as the comparator outputs.
Figure 3:
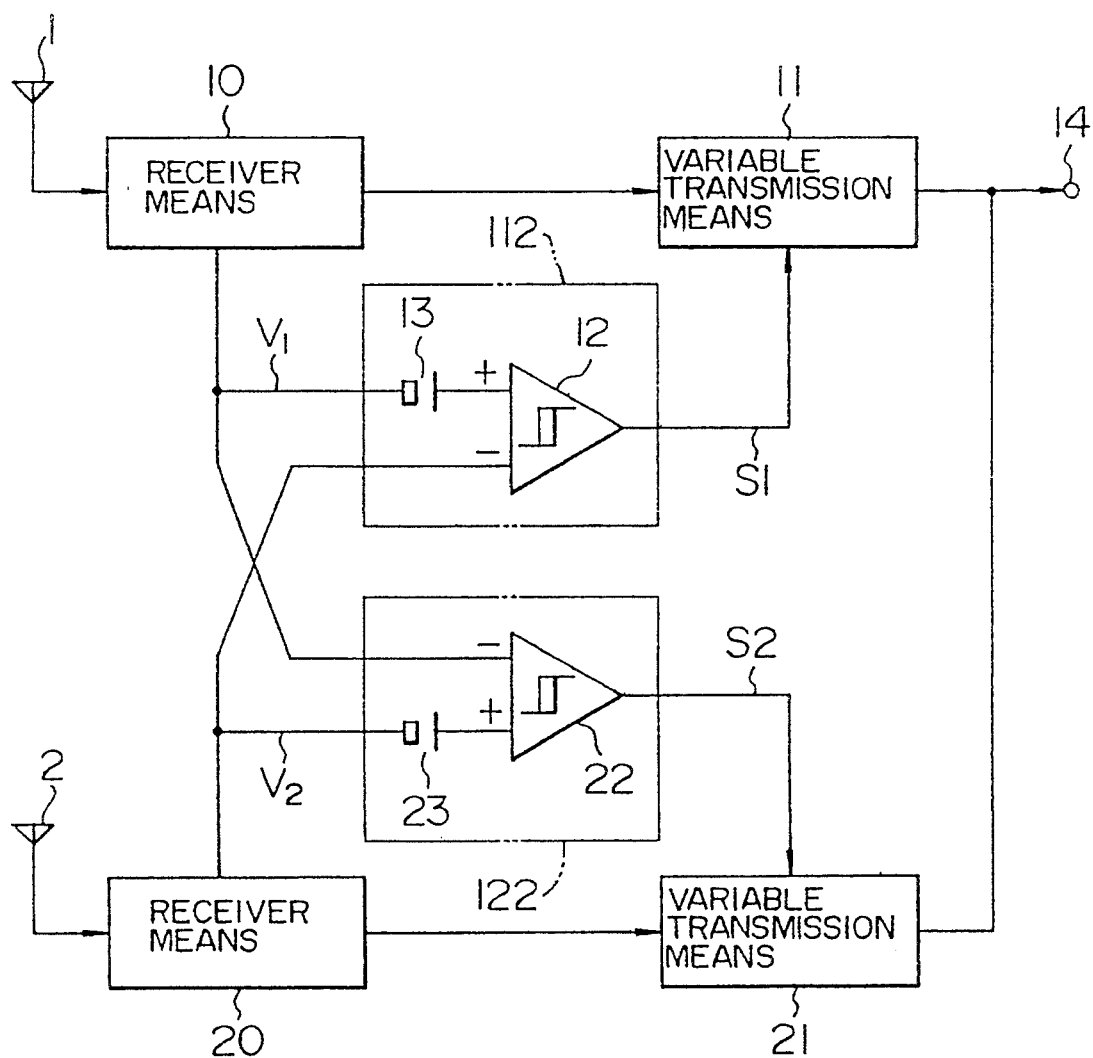
FIG. 3 is a schematic block diagram of a typical diversity receiver to which the first embodiment of the comparator device according to the present invention is applied.

FIG. 3 is a schematic block diagram of a typical diversity receiver to which the first embodiment of the comparator device according to the present invention is applied. In the construction of the first embodiment illustrated in FIG. 3, the elements common to or equivalent to those in the conventional construction of FIG. 1 will be represented by the same reference numerals.

In the diversity receiver illustrated in FIG. 3, in which the first embodiment of the comparator device is employed, the reference numerals 1 and 2 denote the first and second antennas corresponding to respective receiving channels for receiving a common modulation signal, and 10 and 20 denote the first and second receiver means respectively corresponding to the receiving channels. Through respective receiving channels, first and second demodulation signal outputs of the received signals, and the first and second receiving condition signals $V_1$ and $V_2$ corresponding to the receiving conditions of respective receiving channels, are obtained. The first and second receiving condition signals $V_1$ and $V_2$ have characteristics to be greater for better receiving condition.

The reference numerals 11 and 21 denote the first and second variable transmission means for transmitting the first and second demodulated signals from the first and second receiving means 10 and 20 to the common output terminal 14.

The reference numerals 112 and 122 denote first and second voltage comparison type comparator means respectively including voltage sources 13 and 23 and comparators 12 and 22. The first and second comparator means have identical offset characteristics and hysteresis characteristics. Respective pairs of inputs of the first and second comparator 12 and 22 have mutually different polarities and the inputs having the different polarities are connected to each other. The first and second receiving condition signals $V_1$ and $V_2$ are supplied from the first and second receiver means 10 and 20 to respective inputs of the first and second comparator means 112 and 122. The first and second comparator means 112 and 122 compare the inputs and respectively output first and second comparator output condition signals $S_1$ and $S_2$. The outputs of the first and second comparator means 112 and 122 are respectively supplied to corresponding ones of the first and second variable transmission means 11 and 21 so that the variable transmission means is controlled into a conducting state in response to HIGH level of the corresponding ones of the first and second comparator output condition signals $S_1$ and $S_2$, and into a non-conducting state in response to LOW level of the corresponding ones of the first and second comparator output condition signals $S_1$ and $S_2$. Therefore, one of the first demodulated signal from the first receiver means 10 and the second demodulated signal from the second receiver means 20 is selectively transmitted to the output terminal 14.

Subsequently, the operation of the diversity receiver having the first embodiment of the comparator device will be discussed with reference to FIG. 4.

Figure 4:
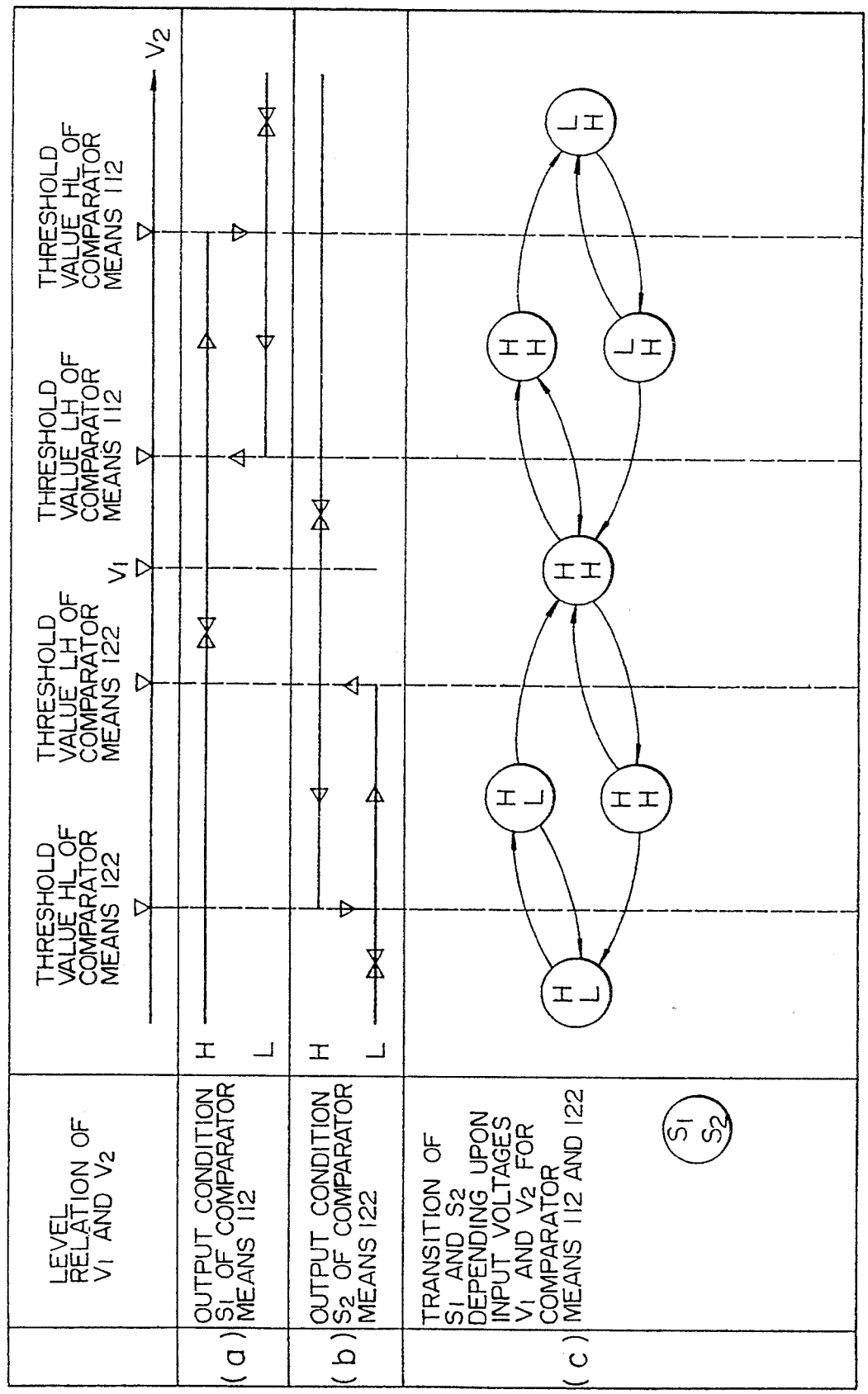
FIG. 4 is a chart showing transition states in the first embodiment comparator device, in which is illustrated the relationship between signal levels of respective first and second receiving condition signals as inputs for first and second comparator means and first and second comparator output condition signals as the comparator outputs.

FIG. 4 illustrates the relationship between the first and second receiving condition signals $V_1$ and $V_2$ as the inputs for the first and second comparator means 112 and 122 and the first and second comparator outputs condition signals $S_1$ and $S_2$ as the outputs thereof.

Here, (a) and (b) of FIG. 4 show the relationship between the threshold values of the first and second comparator means 112 and 122 having identical offset characteristics and hysteresis characteristics and the comparator outputs condition signals $S_1$ and $S_2$, with respect to the first receiving condition signal $V_1$. For these first and second comparator means 112 and 122, the same threshold values are provided. The threshold values for each of the comparator means 112 and 122 are provided offset characteristics so that, taking the non-inverting input thereof as a reference value, both of the threshold values are greater than the reference value. Since the different polarities of inputs of the first and second comparator means 112 and 122 are connected to each other, the relationship of the levels of the threshold values in the second comparing means 122 is reversed with taking the first receiving condition signal $V_1$ as a reference. Therefore, the operation as illustrated in (b) of FIG. 4 can be performed.

Namely, in a manner identical to the foregoing conventional comparator device, assuming $V_2 < < V_1$, $S_1 = H$ and $S_2 = L$ are established so that the demodulated signal of the receiver means 10 is supplied to the output terminal 14. Here, when the level of the second receiving condition signal $V_2$ rises to reach the threshold value across which output of the comparator means 122 is switched from L to H, $S_1 = H$ and $S_2 = H$ are established so that the first demodulated signal of the first receiver means 10 and the second demodulated signal of the second receiver means 20 are supplied to the output terminal 14 in parallel. At this time, since each of the demodulated signals is derived through demodulation of the same modulation signals and thus should have the same amplitude, such parallel supply condition of the demodulated signals will never cause variation of the amplitude. When the level of the second receiving condition signal $V_2$ further rises to reach the threshold value, across which the first comparator output condition signal of the first comparator means 112 is switched from H to L, $S_1 = L$ and $S_2 = H$ are established so that the second demodulated signal of the second receiver means 20 is supplied to the output terminal 14 and the first demodulated signal of the first receiver means 10 is disconnected from the output terminal 14 for completing switching operation.

In FIG. 4, (c) shows all possible transitions of the first and second comparator output condition signals $S_1$ and $S_2$ relative to variation of the second receiving condition signal $V_2$ taking the first receiving condition signal $V_1$ as a reference. As apparent from (c) of FIG. 4, in the signal level range close to the condition where the first and second receiving condition signals $V_1$ and $V_2$ become equal to each other, the comparator outputs $S_1$ and $S_2$ of the first and second comparator means 112 and 122 are maintained $S_1 = H$ and $S_2 = H$, and in all possible combinations of the signal levels of the first and second receiving condition signal $V_1$ and $V_2$, the condition in which the first and second comparator outputs become $S_1 = L$ and $S_2 = L$ will never occur.

As set forth above, according to the foregoing first embodiment, since the comparator device comprises the first and second comparator means which have identical offset characteristics and hysteresis characteristics so that, when one of the input signals (first input signal in the shown case) is taken as a reference, both of the threshold values for the other input signal (second input signal in the shown case) become greater than the reference value, there is no possibility of occurrence that both of the first and second variable transmission means are placed in a non-conducting state simultaneously at any combination of two input signals. Also, at the transition for switching, two demodulated outputs can be temporarily transmitted simultaneously so that the signal drop out and click noise due to delay of operation of the transmission means can be effectively eliminated.

Figure 5:
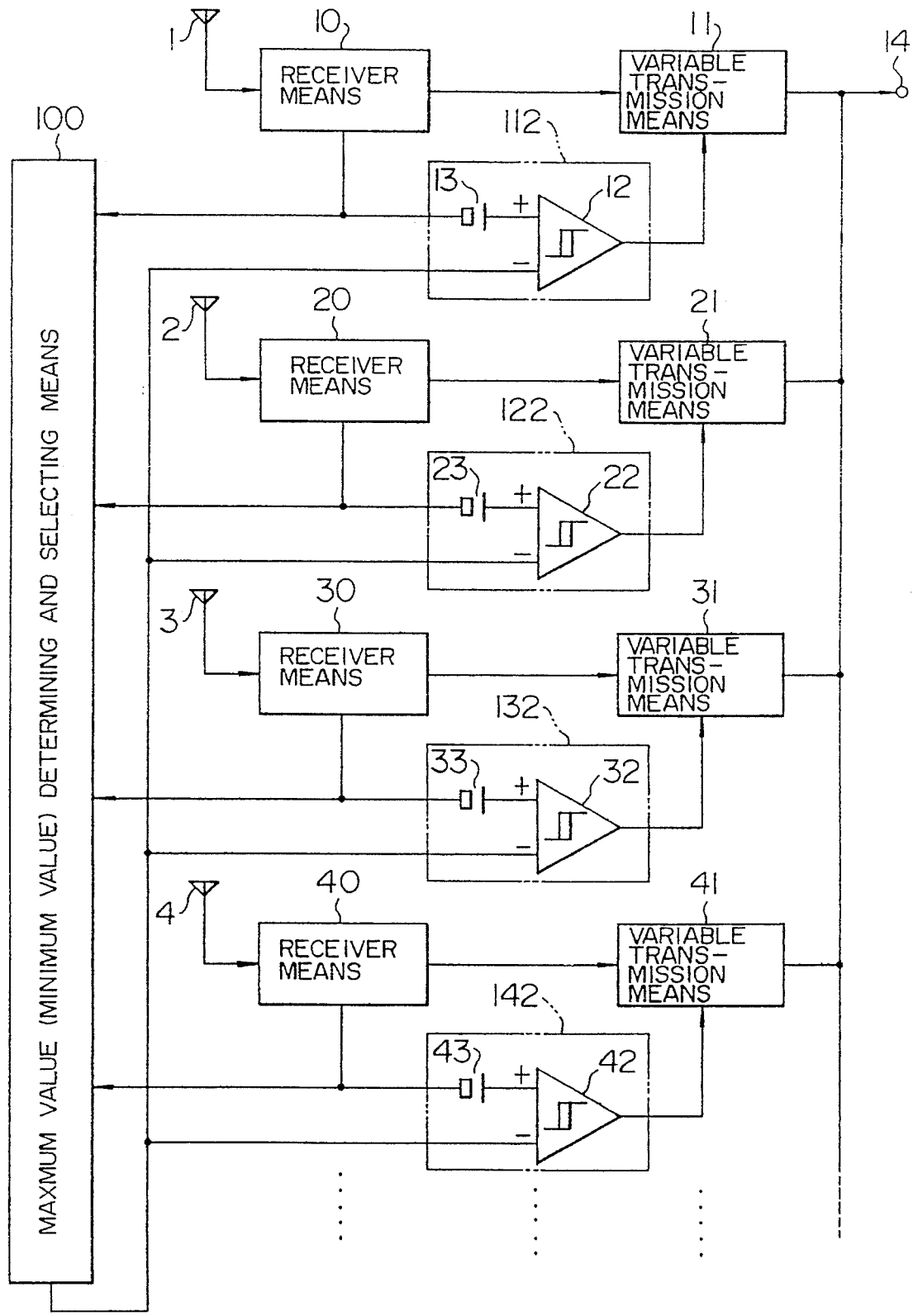
FIG. 5 is a schematic block diagram of a diversity receiver having a plurality of receiver means, to which the second embodiment of the comparator device, according to the present invention, is applied.

FIG. 5 is a schematic block diagram of a diversity receiver having a plurality of receiver means, to which the second embodiment of the comparator device, according to the present invention, is applied.

In the diversity receiver of FIG. 5 employing the second embodiment of the comparator device, the reference numerals 1, 2, 3 and 4 denote first, second, third and fourth antennas corresponding to respective receiving channels for respectively receiving a common modulation signal, and 10, 20, 30 and 40 denote first, second, third and fourth receiver means corresponding to the respective receiving channels. The first, second, third and fourth receiver means 10, 20, 30 and 40 provide first, second, third and fourth demodulated signals and first, second, third and fourth receiving condition signals corresponding to respective ones of the receiving conditions of the corresponding receiver means. The signal level of the first, second, third and fourth receiving condition signals is increased at better receiving conditions.

The reference numerals 11, 21, 31 and 41 denote the first, second, third and fourth variable transmission means for transmitting the first, second, third and fourth demodulated signals from the first, second, third and fourth receiving means 10, 20, 30 and 40 to the common output terminal 14.

The reference numerals 112, 122, 132 and 142 denote first, second, third and fourth voltage comparison type comparator means respectively including voltage source 13, 23, 33 and 43 and comparators 12, 22, 32 and 42. The first, second, third and fourth comparator means have identical offset characteristics and hysteresis characteristics. Respective pairs of inputs of the first, second, third and fourth comparators 12, 22, 32 and 42 have mutually different polarities and connected to ones of first, second, third and fourth receiver means 10, 20, 30 and 40. The respective receiving condition signals are supplied from the receiver means 10, 20, 30 and 40 to respective non-inverting inputs of the first, second, third and fourth comparator means 112, 122, 132 and 142. To the inverting inputs of the first, second, third and fourth comparator means 112, 122, 132 and 142, an output of a maximum value (minimum value) to determining and selecting means 100 is applied. Respective comparator means 112, 122, 132 and 142 compares the inputs and respectively outputs comparator output condition signals. The outputs of the comparator means 112, 122, 132 and 142 are respectively supplied to corresponding ones of the variable transmission means 11 21, 31 and 41 so that the variable transmission means is controlled into a conducting state in response to H level of the corresponding ones of the comparator output condition signals and into a non-conducting state in response to L level of the corresponding ones of the comparing output condition signals.

The maximum value determining and selecting means 100 receives the receiving condition signals from the receiver means 10, 20, 30 and 40 for selecting the best one. Namely, the maximum value determining and selecting means 100 selects one of the receiving condition signals having the greatest value representing the best receiving condition, to supply the selected receiving condition signal to the inverting inputs of respective first, second, third and fourth comparator means 112, 122, 132 and 142.

Subsequently, the operation of the diversity receiver having the second embodiment of the comparator device will be discussed.

In the construction of the second embodiment, assuming that the receiver means 10 is receiving in the best condition among other receiver means, the receiving condition signal of the receiver means 10 becomes the greatest among the receiving condition signals. Accordingly, the maximum value determining and selecting means 100 selects the receiving condition signal from the receiver means 10 and outputs the same for the inverting inputs of respective ones of the first to fourth comparator means 112, 122, 132 and 142.

In this case, when the best receiving condition signal is applied to the inverting input of the first comparator means 112 from the maximum value determining and selecting means 100, the output of the first comparator means 112 becomes H because the receiving condition signal from the receiver means 10 is directly applied to its non-inverting input and the first comparator means has the offset characteristics as set forth above. Therefore, the first variable transmission means 11 is controlled into the conducting state to supply the demodulated output of the receiver means 10 to the output terminal 14.

On the other hand, when a difference between the receiving condition signal of the second receiver means 20 and the selected receiving signal from the maximum value determined and selecting means 100, i.e. the receiving signal of the first receiver means 10, is smaller than the offset value, the output of the second comparator means 122 also becomes H level. In such case, the corresponding second variable transmission means 21 is controlled into the conducting state to supply the demodulated output of the second receiver means 20 to the output terminal 14 in parallel to that of the receiver means 10 through the first variable transmission means. Such condition of parallel transmission of the demodulated outputs can also be temporarily established upon transition for switching the demodulated output to be supplied to the output terminal in response to the substantial change of the receiving condition signals.

As described above, in the construction of the second embodiment as set forth above, and similarly to the foregoing first embodiment, the comparator means comprises the first to fourth comparator means having offset characteristics and the hysteresis characteristics so that, when one of the input signals is taken as a reference, both of the threshold values for the other input signal become greater than the reference value. Therefore, there is no possibility of occurrence that all of the first to fourth variable transmission means are placed in the non-conducting state simultaneously at any combination of four input signals. Also, at the transition for switching, a plurality of demodulated outputs can be temporarily transmitted simultaneously so that the signal drop out and click noise due to delay of operation of the transmission means can be effectively eliminated.

Here, though the first and second embodiments are provided receiving condition signals which increase the signal levels at better receiving condition, it may be possible to provide a receiving condition signal which decreases the signal level at better receiving condition. In such case, the polarities of the inputs for the comparators and offsets become reversed. In addition, in case of the second embodiment, the maximum value determining and selecting means is replaced with a minimum value determining and selecting means for selecting the smallest value of the receiving condition signal as output for the comparator means. Such arrangement will provide completely the same effect as that discussed above.

Furthermore, in the foregoing first and second embodiments as set forth above, each comparator means is designed to be responsive to a difference of the input voltages. Namely, assuming the input voltage at the non-inverting input is taken as a reference, the values of the hysteresis and the offset are set as a difference from this reference. Therefore, even when the reference changes the value significantly, the hysteresis and the offset may have approximately equal difference relative to the reference. Such setting is adapted for the case, in which a signal indicative of the intensity of the received signal associated with an intermediate frequency amplifier IC (such as SIGNETICS Co. NE614) used in the receiver means, is used as the receiving condition signal of the receiver means. This is because that the signal indicative of the intensity of the received signal is obtained as an approximated voltage for log value of the amplitude of the received signal, and therefore, can be at the same decibel value at any range as converted into the amplitude of the input receiving signal of the receiver means as long as the voltage difference is the same even when the voltage changes significantly.

Here, if the receiving condition signal of the receiver means varies linearly corresponding to variation of the amplitude of the input receiving signal of the receiver means, the values of the hysteresis and the offset of the comparator means has to be set as a ratio relative to the reference. Namely, the offset value and the hysteresis value must have characteristics to be greater or smaller in decibel level so that approximately the same ratio can be maintained relative to the reference even when the reference changes substantially. By providing such characteristics for the offset value and the hysteresis value, the first and second embodiment of the comparator devices become applicable for the receiving condition signal of the receiver means linearly corresponding to the input receiving signal amplitude. Therefore, it should be appreciated that the hysteresis and offset may be provided as the difference or ratio relative to the reference with one of the inputs being taken as a reference. In either case, the comparator device according to the present invention may provide substantially the same effect.

In addition, though the foregoing first and second embodiments are constructed to have the comparator means which compares the input voltages, the comparator means can be replaced with a comparator means which compares input currents. Even in the latter case, although the manner of comparison becomes different, the comparator device with the current comparison type comparator means can provide substantially the same effect to that discussed above. One example is shown in FIG. 6.

Figure 6:
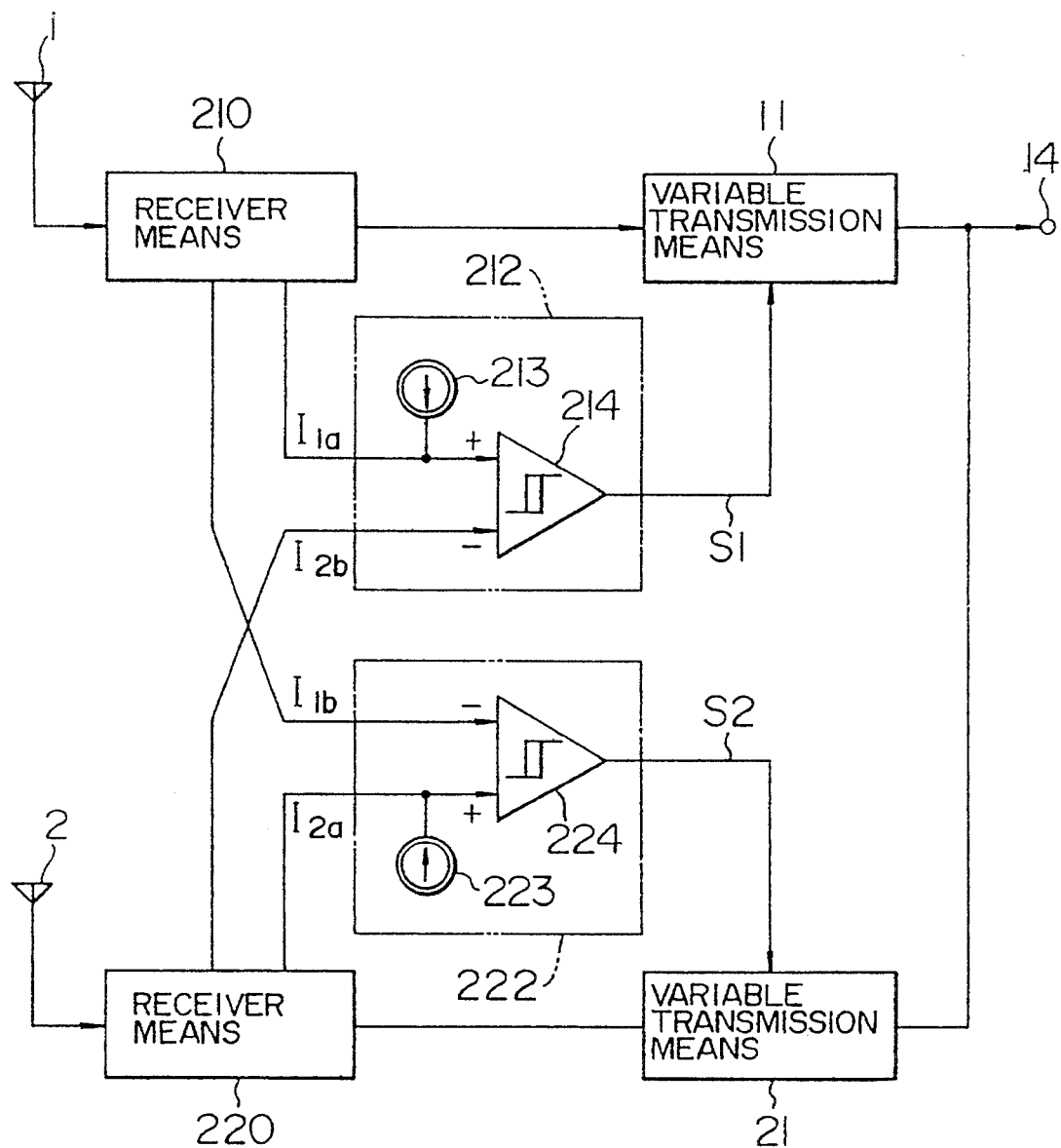
FIG. 6 is a schematic block diagram of a typical diversity receiver to which the third embodiment of the comparator device according to the present invention is applied.

FIG. 6 is a block diagram of the diversity receiver system including a plurality of receiver means, for which the third embodiment of the comparator device, according to the invention, is applied. In the case of this third embodiment, in place of the voltage comparison type first and second comparator means 112 and 122 as in the first embodiment, current comparison type first and second comparator means 212 and 222, which comprise constant current source 213 and 223 and comparator 214 and 224, are employed. In this third embodiment, the comparison is thus made with respect to current.

Namely, the receiving condition signal output from the first and second receiver means 210 and 220 are both current signals. Each of the receiver means 210 and 220 outputs two current signals having the same magnitude. Each receiver means 210 and 220 supplies one of the current output of the receiver means to the corresponding one of the comparators means 212 and 222 for controlling transmission of the demodulated signal output therefrom, and supplies the other current output to the other comparator means 222 and 212 for controlling transmission of the demodulated signal output from the other receiver means.

In the case of the voltage comparison type as in the first embodiment of FIG. 3, since the receiving condition signal is the voltage signal and thus can be easily delivered to a plurality of destination elements, i.e. comparator means, it may require a single output. In contrast to this, in the case of the current comparison type comparator means, transmission can be made through a single terminal and this can avoid influence of the grounding voltage level. Such property is considered suitable for setting the hysteresis and offset as the ratios. On the other hand, delivery of the current output for a plurality of destination elements requires a corresponding number of outputs. Similarly, the voltage comparison type comparator means in the second embodiment of the comparator device shown in FIG. 5 can be replaced with a current comparison type comparator means. In such case, each receiver means is provided two outputs for the receiving condition signal so that the one current output is supplied to the maximum value determining and selecting means and the other current output is supplied to the corresponding comparator means. The maximum (minimum) value determining and selecting means is provided outputs corresponding to the number of receiving condition signals input thereto. Nevertheless, with the current comparison type comparator means in either of these cases, the comparator device can provide substantially the same effect as that of the former embodiments.

Considering the first and second embodiment of FIGS. 3 and 5, the receiver means, the comparator means, the variable transmission means forming each receiving channel are identical to one another. Therefore, these elements can be combined into one receiving unit. With respect to the receiving unit thus constructed, the receiving signal input terminal to be connected to the antenna, the output terminal at the receiver means, the other input terminal at the comparator means to be connected to the receiving means in other receiving unit, the output terminal at the variable transmission means are provided for forming into a single module. By providing common specification for such module, it becomes applicable for mass-production process for lowering production cost. In this case, the first embodiment of the comparator device can be formulated simply by connecting two modules. Also, by providing the desired number of modules of the receiving units, and the signal maximum (minimum) value determining and selecting means, the second embodiment of the comparator device can be formulated through a simple process at low cost. Furthermore, by forming the major elements, such as the intermediate frequency amplifier, the receiving condition signal generator, the comparator means, and the variable transmission means in the receiving unit, on a semiconductor integrated circuit board, designing and production of the module of the receiving unit become simpler and easier.

Moreover, regarding the maximum value (minimum value) determining and selecting means 100 and other cooperating elements in FIG. 5, it should be noted that each offset voltage source 13, 23, 33 and 43 sets a voltage difference between the input level and a receiving condition signal output from the receiver means. The receiving condition signal indicates the receiving condition of the receiver means, and it may have characteristics so as to be greater for better receiving conditions, as described above. Additionally, it may be possible to provide a receiving condition signal, the signal level of which decreases for better receiving conditions, also as described above. Moreover, as noted above, the receiving condition signal may be a signal indicating the intensity of the received signal associated with an intermediate frequency amplifier IC (such as SIGNETICS Co. NE6114) used in the receiver means, which signal is obtained as the approximated voltage for log value of the amplitude of the received signal. The maximum value determining and selecting means 100 selects the one of the receiving condition signals having the greatest value. Also, the maximum value determining and selecting means 100 may be constructed by using an analog switch and usual comparators or discrete diodes and a transistor, for example. The maximum value is determined and selected continuously because the maximum value determining and selecting means 100 operates on the basis of current levels of the plurality of receiving condition signals.

On the other hand, the maximum value determining and selecting means 100 can be replaced with a minimum value determining and selecting means for selecting the smallest value of the receiving condition signal, as described above.

It should further be noted that the output of each comparator is a signal having a H (high) level or L (low) level.

Figure 7A:
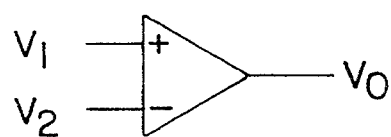
FIGS. 7A-E illustrate the basic configuration of each of the first through eighth cases mentioned above, with FIG. 7A illustrating the operation of the comparator, FIG. 7B corresponding to the first and fifth cases, FIG. 7C to the second and sixth cases, FIG. 7D to the third and seventh cases and FIG. 7E to the fourth and eighth cases.
Figure 7B:
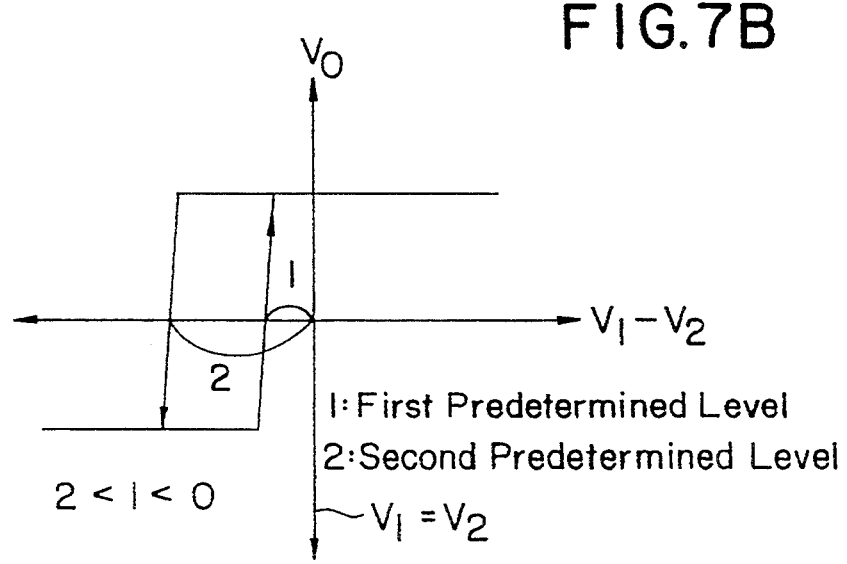
Figure 7C:
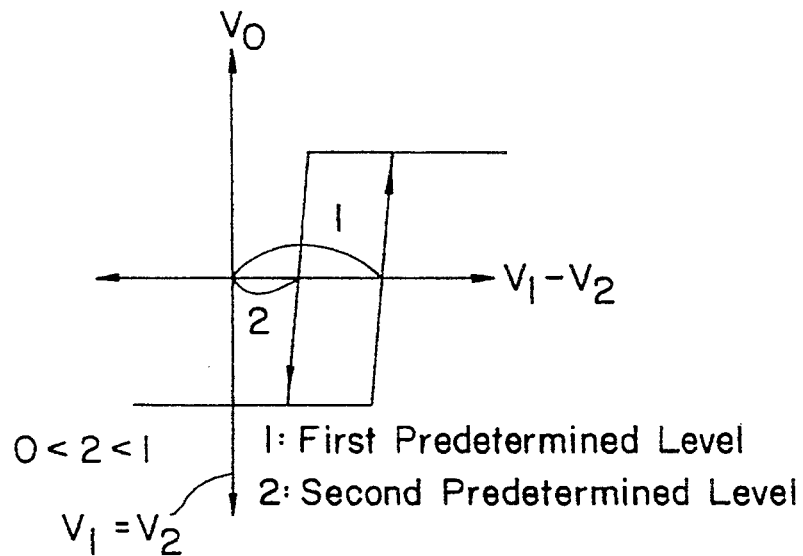
Figure 7D:
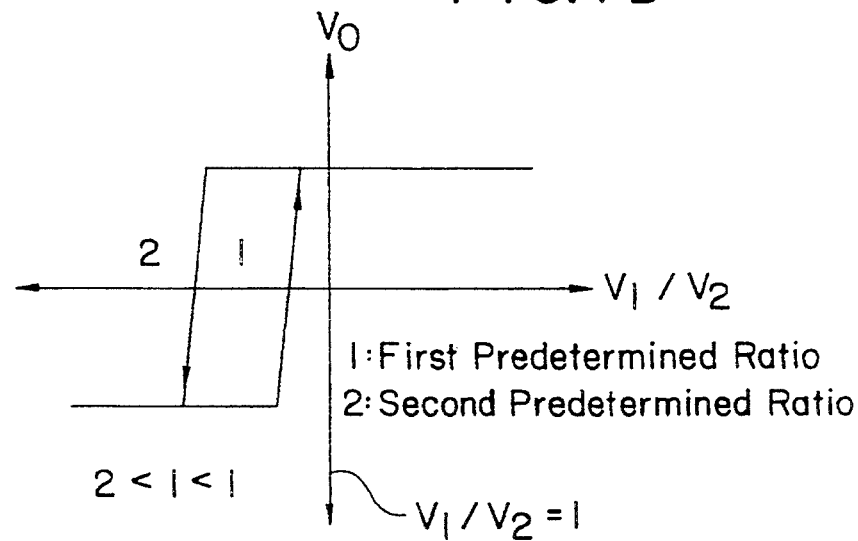
Figure 7E:
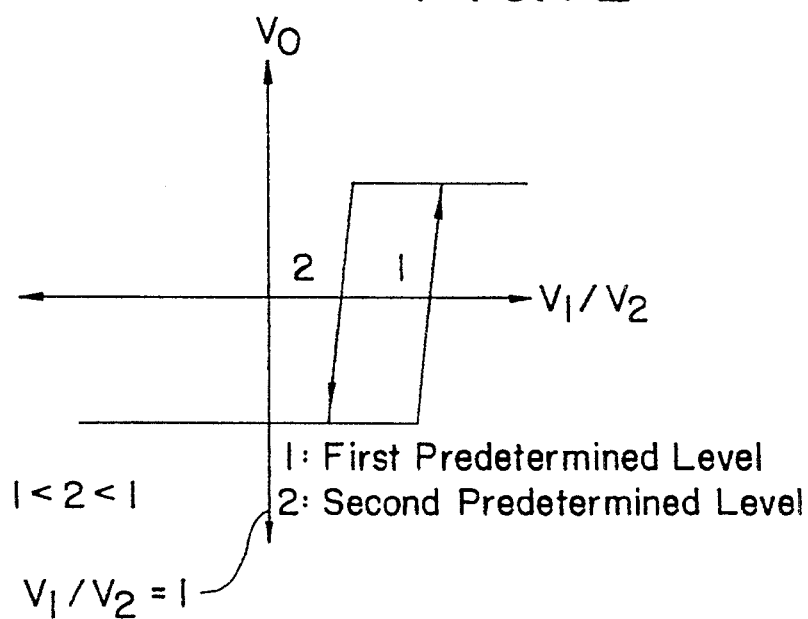

From the above, it is apparent that the comparator device according to the present claimed invention comprises a plurality of comparator means, each having an offset characteristic and a hysteresis characteristic as described above. These features provide the advantage of reducing operational errors resulting from noise and the like. The offset level of each comparator, for example, may be larger than one half of the width of the hysteresis input level so as to output a binary signal having a preset one of the first and second values when the level of the signal applied to the first terminal is equal to the level of the signal applied to the second terminal, as illustrated in FIGS. 7B–7E which illustrate the basic configuration of each of the first through eighth cases discussed above, with the operation of the comparator means as shown in FIG. 7A.

It should be noted that the above description and the accompanying drawings are merely illustrative of the application of the principles of the present invention and are not limiting. Numerous substitutions, modifications, alternatives and variations which embody the principles of the invention and which fall within its spirit and scope may be devised by those skilled in the art in light of the above teachings.

What is claimed is:

1. A comparator device for comparing signal levels of first and second input signals and outputting independently two comparison results, said device comprising:

first and second comparator means, each including a first terminal and a second terminal and each for comparing a level of a signal applied to said first terminal with a level of a signal applied to said second terminal and for outputting a binary signal (a) which has a first value when the level of the signal applied to said first terminal minus the level of the signal applied to said second terminal is greater than a first predetermined level, (b) which has a second value when the level of the signal applied to said first terminal minus the level of the signal applied to said second terminal is less than a second predetermined level, said first predetermined level being larger than said second predetermined level and both having the same sign, (c) which maintains one of said first and second values when the level of the signal applied to said first terminal minus the level of the signal applied to said second terminal is less than said first predetermined level and greater than said second predetermined level, wherein said binary signal takes a fixedly determined one of said first value and said second value when the level of the signal applied to said first terminal is equal to the level of the signal applied to said second terminal;

means for applying said first input signal to the first terminal of said first comparator means and to the second terminal of said second comparator means;

means for applying said second input signal to the second terminal of said first comparator means and to the first terminal of said second comparator means; and means for outputting the binary signals output from said first and second comparator means as the two comparison results of said comparator device.

2. A comparator device according to claim 1, wherein each of said first and second comparator means is formed into an integrated module.

3. A comparator device for comparing signal levels of first and second input signals and outputting independently two comparison results, said device comprising:

first and second comparator means, each including a first terminal and a second terminal and each for comparing a level of a signal applied to said first terminal with a level of a signal applied to said second terminal and for outputting a binary signal (a) which has a first value when a ratio of the level of the signal applied to said first terminal to the level of the signal applied to said second terminal is greater than a first predetermined ratio, (b) which has a second value when the ratio of the level of the signal applied to said first terminal to the level of the signal applied to said second terminal is less than a second predetermined ratio, said first predetermined ratio being larger than said second predetermined ratio and both being within one of a range less than 1 and a range greater than 1, and (c) which maintains one of said first and second values when the ratio of the level of the signal applied to the first terminal to the level of the signal applied to the second terminal is less than said first predetermined ratio and larger than said second predetermined ratio, wherein said binary signal takes a fixedly determined one of said first value and said second value when the level of the signal applied to said first terminal is equal to the level of the signal applied to said second terminal;

means for applying said first input signal to the first terminal of said first comparator means and to the second terminal of said second comparator means:

means for applying said second input signal to the second terminal of said first comparator means and to the first terminal of said second comparator means; and means for outputting the binary signals output from said first and second comparator means as the two comparison results of said comparator device.

4. A comparator device according to claim 3, wherein each of said first and second comparator means is formed into an integrated module.

* * * * *